(12) United States Patent
Foltuz et al.

(10) Patent No.: US 6,206,674 B1
(45) Date of Patent: Mar. 27, 2001

(54) INJECTION MOLDING APPARATUS WITH REMOVABLE HETERO-MOLDING TOOLS

(75) Inventors: Eugene L. Foltuz; Norman H. Cohan; Enidio A. Gomez, all of Miami Lakes, FL (US)

(73) Assignee: Security Plastics, Inc., Miami Lakes, FL (US)

( * ) Notice: Subject to any disclaimer, the term of this patent is extended or adjusted under 35 U.S.C. 154(b) by 0 days.

(21) Appl. No.: 09/223,854

(22) Filed: Dec. 31, 1998

(51) Int. Cl.$^7$ ..................................................... B29C 45/40
(52) U.S. Cl. ........................ 425/185; 425/190; 425/192 R
(58) Field of Search .................................... 425/182, 185, 425/190, 192 R (56) References Cited

U.S. PATENT DOCUMENTS

| | | |
|---|---|---|
| 3,871,611 | 3/1975 | Taketa . |
| 4,416,604 | 11/1983 | Bender et al. . |
| 4,828,479 | 5/1989 | Pleasant . |
| 4,959,002 | 9/1990 | Pleasant . |
| 5,302,103 | 4/1994 | Brown et al. . |

*Primary Examiner*—Tim Heitbrink
(74) *Attorney, Agent, or Firm*—Lott & Friedland, PA (57) ABSTRACT

An injection molding press apparatus for use with a variety of different interchangeable molding tools that allows the simultaneous molding of different parts. The interchangeable molding tools are custom designed to form a desired part. Each interchangeable molding tool allows for the easy replacement of different types of molding tools for the molding of different parts without the need of an entire mold replacement. A preferred embodiment of the invention comprises a baffle sorting system for injection molding machines thereby increasing the allowing the simultaneously molded different parts to be ejected from the machine without the need of separating the different parts. This increases the speed of each production run.

12 Claims, 5 Drawing Sheets

INJECTION MOLDING APPARATUS WITH REMOVABLE HETERO-MOLDING TOOLS

CROSS REFERENCE

The present application is related to the following copending applications, filed herewith on Dec. 23, 1998, entitled: "Water Jacket Apparatus For Injection Molding Systems" and "Baffle Sorting System For Injection Molding Machines," and assigned application Ser. Nos. 09/224,263 and 09/223,857 respectively.

FIELD OF THE INVENTION

The present invention relates generally to injection molding and more particularly, to improvements in an injection molding press apparatus with removable and interchangeable molding tools.

BACKGROUND OF THE INVENTION

Injection molding techniques have for some time been used for molding various parts, particularly of plastic. The injection molding apparatus conventionally consists of a mold formed of two halves typically, one or more pairs of fixed and movable bases (also referred to A and B mold bases respectively), which are mounted, respectively, on the top clamp plate and base support plate of the injection mold base mounted on the molding machine. Mold inserts, plural A and B mold inserts, which are adapted to fit into the fixed and movable sides of the machine usually have mold cavity defining means which are fixed in the bases in paired alignment, whereby upon closure of the base support plate toward the top clamp plate respective pairs of oppositely disposed mold inserts are brought together to close the mold cavities. Molding material is fed through the top clamp plate and A mold base thereon to a runner distribution system in the two mold sides, and molding material is delivered from such distribution system to respective mold cavities to mold parts. An ejector apparatus usually is provided to eject the molded parts from the opened mold cavities and the excess mold from the runner distribution system by means of ejector pins that extend, for example, through the base support plate, B mold base and B mold inserts mounted thereon.

Molds with removable mold inserts for mold frames are in use and are especially valuable for prototype or low production molding needs wherein the tooling is changed after relatively short time. However, the known molds of this type only allow for molding of several like-parts and does not allow for the molding of different parts. In order to mold a different part, the entire mold assembly must be changed. Because only the same mold inserts can be used at the same time, the molding of different parts still requires substantial changeover time. The need exists for an inexpensive and efficient mold injection apparatus that molds different parts at the same time and requires only minimal changeover time and machining operations.

Previous attempts to provide an injection molding apparatus containing removable interchangeable molding tools are described in U.S. Pat. No. 3,871,611 to Taketa ('611 patent); U.S. Pat. No. 4,828,479 to Pleasant ('479 patent); U.S. Pat. No. 4,959,002 to Pleasant ('022 patent); U.S. Pat. No. 5,302,103 to Brown ('103 patent); and U.S. Pat. No. 4,416,604 to Bender ('604 patent) all of which are incorporated herein by reference.

The '611 patent describes an improved mold having removable and replaceable cores (mold inserts or molding tools) and cavities, so that the need of providing a new mold base for every new part or product is eliminated. The arrangement of the mold is such that the cores and cavities can be easily and quickly removed and replaced with minimum down time of the molding apparatus.

The '479 patent describes a molding apparatus for use with removable inserts, described in patent '002. The molding apparatus comprises a cavity insert for the injection side and a core insert for the ejection side of a mold which are each shaped as a generally cylindrical, stepped body provided with circumferentially extending locking grooves and a liquid cooling or heating channel. Insert retainers and lifters having rotatable elements with locking tongues engaging the locking grooves clamp the inserts in the main mold frame. The main mold frame is provided with liquid conduits opening to opposite ends of the liquid channels so that the need for machine liquid conduits and channels for different inserts is avoided. Ejector tooling may be connected to the core insert for insertion and removal with it.

The '103 patent describes an injection molding machine which allows batch-conversions to be performed without significant machine downtime and/or the use of specialized tools. The molding apparatus provides a frame, an injection assembly coupled to the frame, a press assembly also coupled to the frame, a mold-mounting assembly coupled with the press assembly, and a mold pallet assembly adapted to be mounted to the press assembly by the mold-mounting assembly.

The '604 patent describes an injection molding system with plural pairs of mold inserts that are engageable for mold cavities mounted on mold bases, respectively on the relatively movable top clamp plate and base support plate of an injection molding machine. Rails on those bases hold the mold inserts in place in paired alignment. The '604 patent also describes a multiple stage ejecting and stripping apparatus to strip parts from mold cavities and a technique to eject the sprue before the parts.

None of the devices mentioned above comprise an injection molding apparatus which simultaneously molds different components while allowing the easy replacement of each different mold insert. The '611 patent describes removable mold inserts and a mold assembly which only allows for the simultaneous molding of like components. Similarly, the '479 patent describes a molding apparatus which allows for removable inserts but does not allow for the simultaneous molding of different components. The '103 patent describes a molding apparatus which down sizes batch conversions. Batch conversions refer to the process of changing sides of a mold assembly for the molding of various parts. Thus, the '103 patent does not allow for the simultaneous molding of different components but rather only down-sizes the time in which to change-over from one type of mold to another type of mold.

The above inventions only allow for the use of a uniform set of removable mold inserts. Variation of the parts to be molded requires changing the entire mold assembly. Simultaneous molding of different components can only be achieved by using two separate molding apparatuses, one mold assembly containing a particular uniform set of mold inserts and another mold assembly containing another particular set of uniform of mold inserts. For example, if Customer A desires an A part and customer B desires a B part, the only solution is to use two separate injection molding apparatuses, one containing a uniform set of mold inserts, each mold insert designed to mold an A part, and another molding apparatus containing a uniform set of mold inserts, each mold insert designed to mold a B part.

Consequently, there is a need in the art for a molding press injection apparatus with removable inserts or molding tools, that allows the simultaneous molding of different parts.

There is a further need in the art for an injection molding apparatus that quickly molds the different parts.

Finally, there is a further need in the art to simultaneously manufacture different components, which does not require a substantial change-over time.

SUMMARY OF THE INVENTION

The above and other needs in the art are fulfilled by the provision of an injection molding apparatus comprising a mold assembly comprising an A side and a B side namely, a fixed side having a fixed molding surface and an ejector side having an ejector molding surface, respectively, wherein the molding surfaces when pressed together form a plurality of mold cavities, a plurality of interchangeable molding tools which are releasably attached to the mold assembly, a removable runner distribution system, a securing means for releasably securing the interchangeable molding tools to the mold assembly, a means for injecting a molding material into the mold cavities for forming a plurality of different components, a cooling means for effectively cooling the components once the molding material has set, a means for simultaneously releasing the different components, and a means for separating the different components once the different components are simultaneously released from the mold assembly.

The interchangeable molding tools each comprise a fixed tool side and an ejector tool side. Each molding tool is custom-designed for the molding of a particular shaped component.

The runner distribution system comprises a plurality of interchangeable runner blocks and a plurality of tool runner systems. The securing means for securing the plurality of interchangeable molding tools to the mold assembly comprises a plurality of fixed locking keys and a plurality of ejector rotating locking keys. The cooling means for cooling the different components once the material has been injected into the mold cavities comprises a water jacket apparatus for injection molding systems. The releasing means for simultaneously releasing the different components from the mold assembly once the molding material has set comprises an ejection assembly, and a means for separating the plurality of different components once the different components are simultaneously released comprises a baffle sorting apparatus.

An object of this invention is to provide an injection molding apparatus with removable and interchangeable molding tools that can simultaneously mold a variety of different components.

Another object of this invention is to provide an injection molding apparatus that allows the quick and efficient simultaneous molding of different components avoiding the necessary change over time for the replacement of interchangeable molding tools for the molding of different components.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate preferred and exemplary embodiments, and wherein.

DESCRIPTION OF THE PREFERRED EMBODIMENTS

Figure 1A:
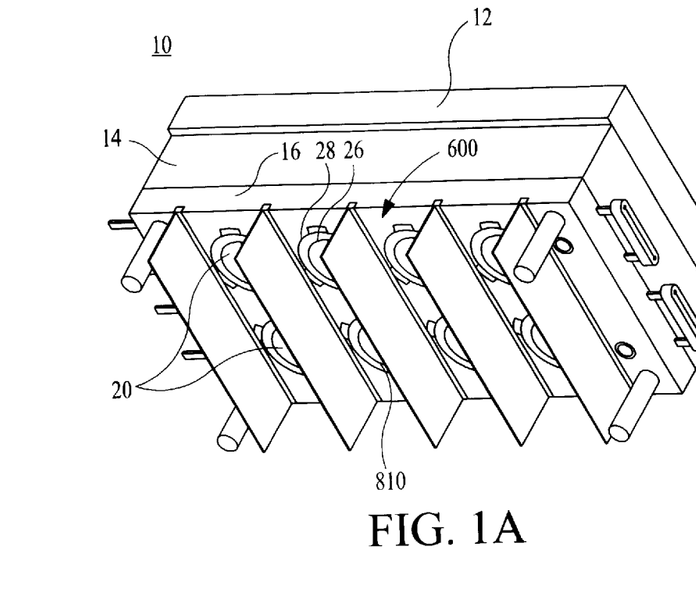
FIGS. 1A and 1B show a perspective view of each side of the mold assembly, a fixed side and an ejector side, in accordance with the present invention.
Figure 1B:
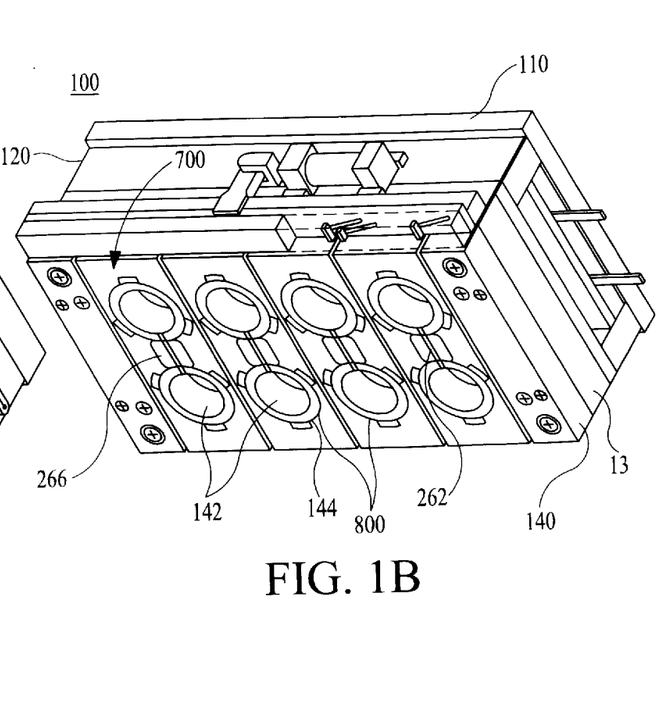

Referring now to the drawings, FIGS. 1A and 1B illustrate a perspective view of both sides of the molding press apparatus, a fixed side having a fixed molding surface 600 designated generally at 10 and an ejector side having an ejector molding surface 700 designated generally at 100, respectively, which are both made in accordance with the present invention. Both sides, 10, 100 when pressed together form a mold assembly comprising a plurality of mold cavities. The molding press apparatus has a plurality of interchangeable molding tools 200 (shown in FIG. 5) which are substantially releaseably affixed to the mold assembly for molding a plurality of different components, a securing means for securing the interchangeable molding tools to the mold assembly (shown in FIGS. 2 and 3), a locking means for locking the mold assembly together when both molding surfaces are pressed together to form the plurality of mold cavities, a means for injecting a molding material into the mold cavities for forming the different components, a cooling means for cooling the different components once the molding material has been injected into the mold assembly, a removable runner distribution system for distributing the molding material to the mold cavities, a simultaneous releasing means for releasing the plurality of different components when the molding material has set, and a means for separating the plurality of different components once the different components are simultaneously released.

Figure 5:
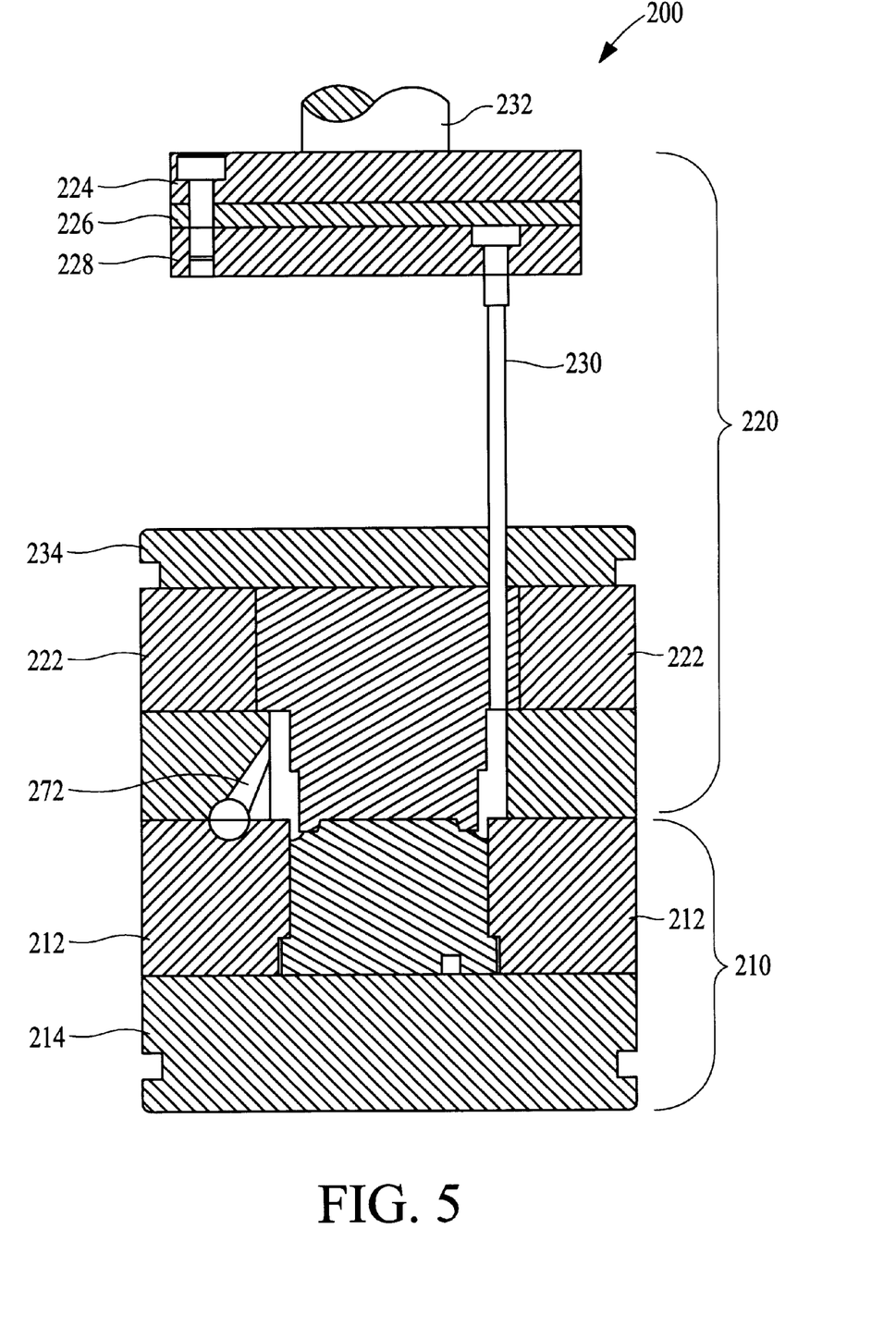
FIG. 5 is a side view of one interchangeable molding tool, in accordance with the present invention.

As shown in FIG. 5, the present invention includes interchangeable molding tools 200 which are custom made for molding a desired plastic component or other material-like component. Each molding tool can be customized to manufacture a desired part. The present invention allows the simultaneous manufacture of different components without the need of changing the entire mold assembly. Moreover the interchangeable molding tools 200 can be easily removed and replaced, if necessary, without the need of replacing an entire side of the mold assembly. The interchangeable molding tools 200 which releasably attach to the mold assembly of the present invention comprise a fixed tool side 210 and an ejector tool side 220. The fixed tool side 210 of the interchangeable molding tool 200 comprises a plurality of fixed tool holder blocks 212 and a fixed tool back-up plate 214. The ejector tool side 220 of the interchangeable molding tool 200 comprises a plurality of ejector tool holder blocks 222, an ejector tool pusher bar retainer plate 224, a first ejector tool back-up plate 226, an ejector tool retainer plate 228 and at least one ejector pin 230 substantially affixed to the first ejector retainer tool back-up plate 226 and extending through the ejector tool retainer plate 228, a second ejector tool back-up plate 234 and a tool pusher bar 232 substantially affixed to the ejector tool pusher bar retainer plate 228. Each side of the interchangeable molding tool 200 can include a plurality of cores and cavities that are designed to form a desired part. Therefore, an interchangeable molding tool can mold either one part or several parts, depending on the size of each desired part.

One embodiment of an interchangeable molding tool that can be used with the present invention is a 3½ in. diameter tool. An alternate embodiment of an interchangeable molding tool that can also be used with the present invention is a rectangular 4½ by 5½ in. plate. The latter embodiment is larger and provides a larger surface area for the molding of either larger parts or an increasing number of smaller parts. Additionally, because of the larger surface area, the 4½ by 5½ in. molding tool provides a spicket that allows water to enter directly into the tool and an O Ring. This allows an even and uniform method of cooling the part.

Figure 2:
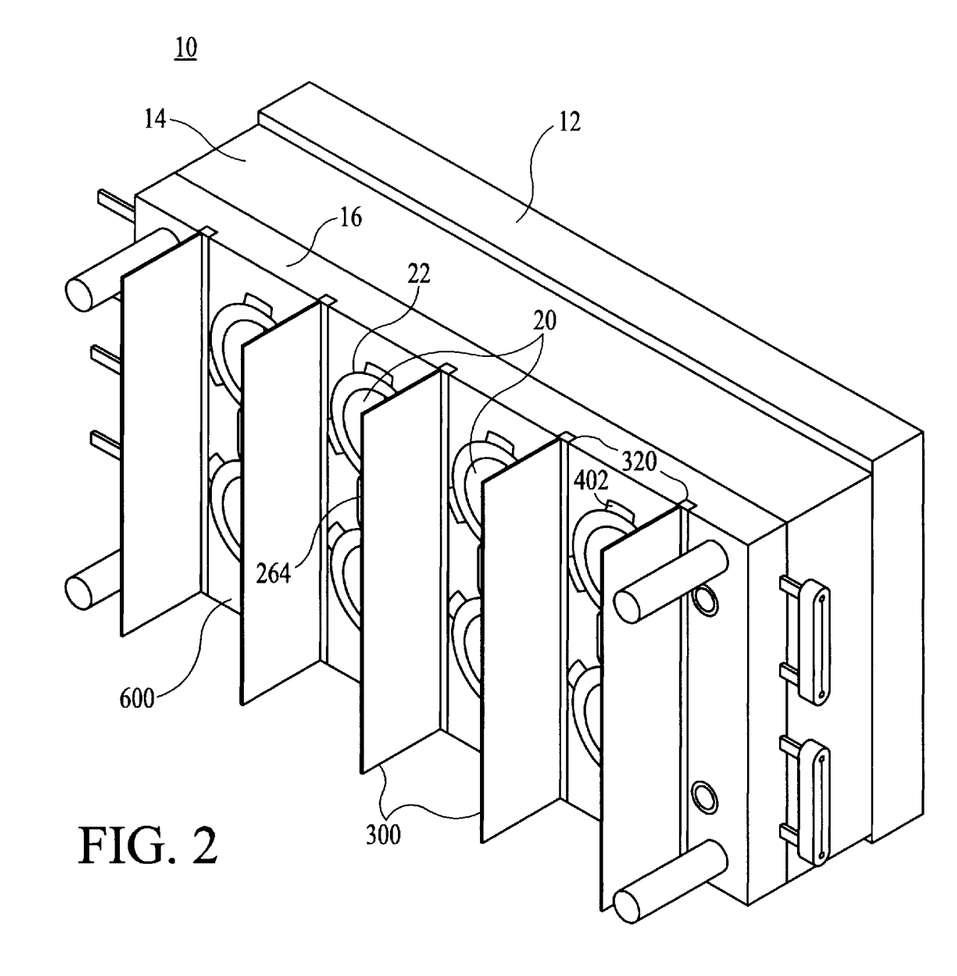
FIG. 2 is an enlarged perspective view of the fixed side of the mold assembly, in accordance with the present invention.

The fixed side of the injection molding press apparatus 10, shown in FIGS. 1A and 2, comprises a top clamp plate 12, a manifold plate 14 and a fixed plate 16 having a fixed molding surface 600, the fixed molding surface 600 having a plurality of fixed mold cavities 20 for insertion of each fixed tool side 210 of said interchangeable molding tools 200, each fixed tool side 210 of said interchangeable molding tools having a size smaller than each fixed mold cavity 20 and each fixed mold cavity 20 having an outside fixed mold cavity perimeter 22.

Figure 3:
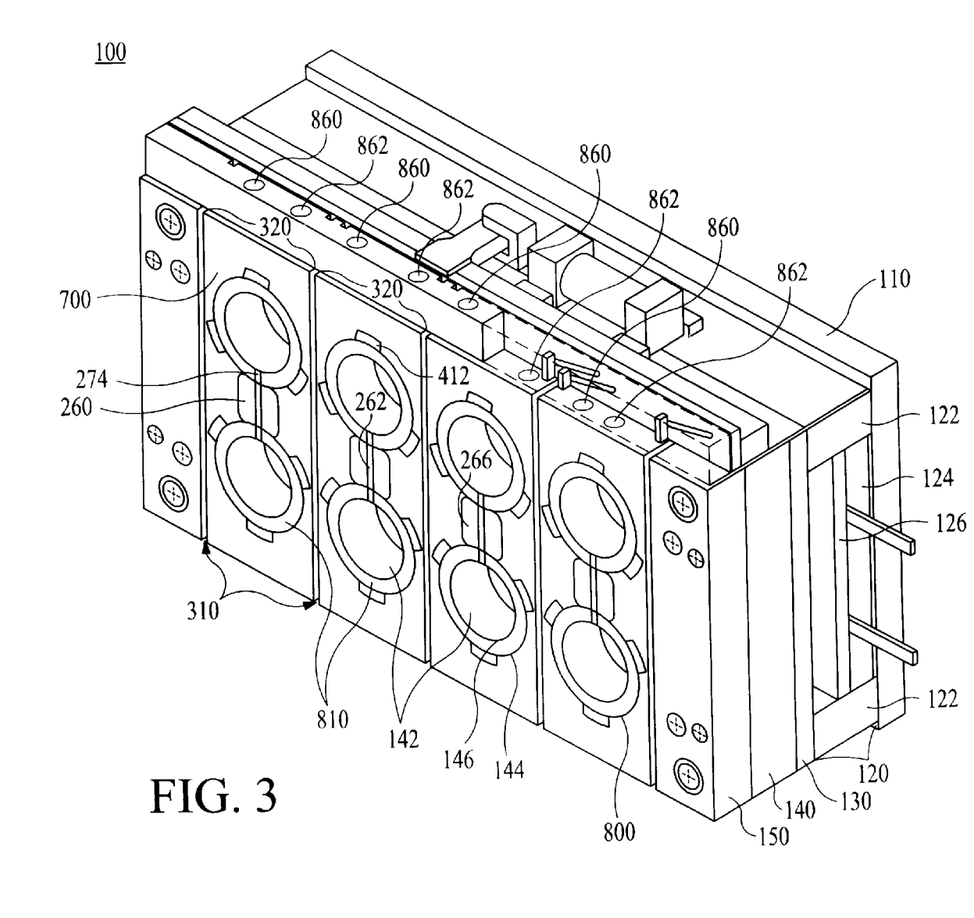
FIG. 3 is an enlarged perspective view of the ejector side of the mold assembly, in accordance with the present invention.

The ejector side of the present invention 100, shown in FIGS. 1B and 3, comprises a plurality of movable plates, including a bottom clamp plate 110, an ejector box assembly 120, a first ejector support plate 130, a second ejector support plate 140 and an ejector plate 150, the ejector plate having an ejector molding surface 700, the ejector molding surface 700 having a plurality of ejector mold cavities 142 for insertion of each ejector tool side 220 of said interchangeable molding tools 200, each ejector tool side 220 having a size smaller than said ejector mold cavities 142 and each ejector mold cavity 142 having an outside ejector mold cavity perimeter 144.

The removable runner distribution system comprises a plurality of interchangeable runner blocks 260 (shown in FIG. 3), each interchangeable runner block 260 having a sprue 262, a fixed runner block side 264 (partially visible in FIG. 2) and an ejector runner block side 266, a tool runner system, having a fixed tool runner side 272 (shown in FIG. 5) and an ejector tool runner side 274. The fixed tool runner side 272 has one end located substantially adjacent to the fixed runner block side 264 and the ejector tool runner side 274 has one end located substantially adjacent to the ejector runner block side 266.

In the illustrated embodiment, the means for allowing the simultaneous molding of different components comprises a baffling sorting apparatus. Because the illustrated embodiment comprises a baffle sorting apparatus, the illustrated embodiment shows a plurality of baffles 300 rigidly fixed and extending perpendicular to the fixed side 10 of the mold assembly and positioned between the fixed mold cavities 20. Accordingly, as shown in FIG. 3, the ejector side of the illustrated embodiment comprises a plurality of slots 310 fashioned to slideably receive the baffles 300 when the fixed side 10 and the ejector side 12 are pressed together. Accordingly, due to the baffles 300 and slots 310, shown in FIG. 2 and 3, both sides of the mold assembly comprise a plurality of equal sections 320, each section 320 designed to receive a pair of uniform molding tools 200. Both sides of the mold assembly 10, 100, as illustrated in FIGS. 2 and 3, are designed to receive a pair of four sets of different molding tools 200. Thus, the illustrated embodiment of the present invention is capable of simultaneously molding four different components.

Figure 4:
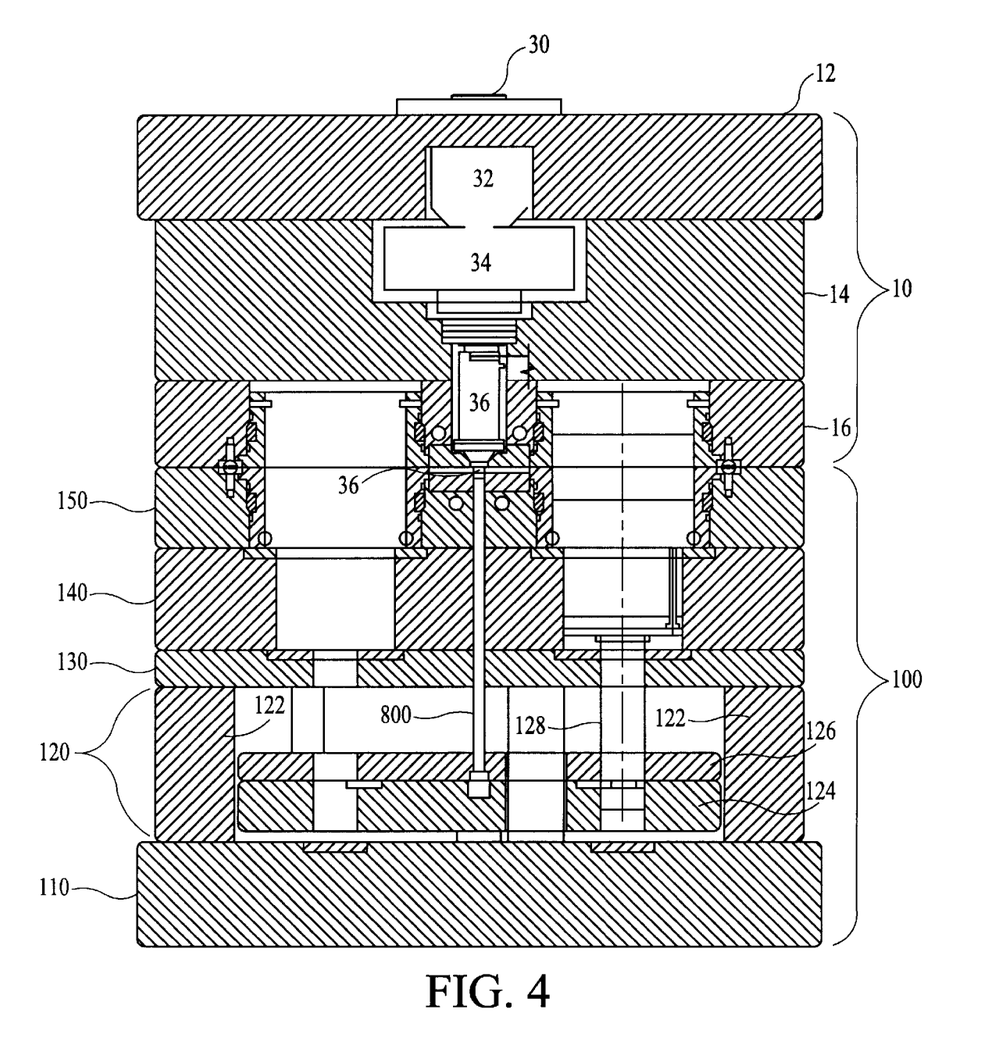
FIG. 4 is a sectional view taken generally transversely through the closed mold sides, to illustrate the manner in which the removable interchangeable molding tools are assembled therein, in conjunction with the ejector assembly.

As shown in FIGS. 3 and 4, within each section 320 of each side of the mold assembly, each interchangeable runner block system 260 is substantially centrally located between a pair of aligned interchangeable molding tools 200 (best shown in FIG. 3). The fixed runner block side 264 is centrally located between two fixed mold cavities 22 wherein the fixed runner block side 264 cooperates fluidly with each fixed tool runner side 272 once the fixed tools sides 210 are inserted into their respective fixed mold cavities 20. The ejector runner block side 266 is centrally located between two ejector mold cavities 142 wherein the ejector runner block side 266 cooperates fluidly with each ejector tool runner side 274 once the ejector tool sides 220 are inserted into their respective ejector mold cavities 142. Deterioration of either the fixed runner block side 264 or the ejector runner block side 266 can be easily replaced by simply removing either side and replacing it with another, thus eliminating the need to change the entire runner distribution system or mold assembly.

Additionally, a plurality of conventional removable runner inserts (not shown) can be used within both the fixed tool side 210 and the ejector tool side 220 of the interchangeable molding tools 200 to be replaced when using a highly abrasive molding material such as glass filled material.

The securing means for securing the interchangeable molding tools 200 to the mold assembly comprises a plurality of fixed keys (not shown) which releasably secure each fixed tool side 210 of the interchangeable molding tools 200 to the fixed side 10 of the mold assembly, the fixed molding surface 600 of the mold assembly having a plurality of fixed key holes 402 (shown in FIG. 2) located substantially adjacent to the outside fixed mold cavity perimeter 22 of each fixed mold cavity 20, and a plurality of ejector keys (not shown) which releasably secure each ejector tool side 220 of each interchangeable molding tool 200 to the ejector side 100 of the mold assembly, the ejector molding surface 700 of the mold assembly having a plurality of ejector key holes 412 (show in FIG. 3) located substantially adjacent to the outside ejector mold cavity perimeter 144.

The locking means for locking the mold assembly in a closed position when the molding material surfaces 600, 700 are pressed together to form the mold cavities, 22, 142 comprises a locking key apparatus. The locking key apparatus comprises an elongated locking bar enclosed within a locking channel bored into a mold base, the locking channel dimensioned to permit movement of the locking bar from a locked position to an unlocked position, one or more cavities within the mold base dimensioned to slideably receive one or more molds, one or more slots in the cavities which open to the locking channel, whereby when the locking bar is in a locked position, a portion of the locking bar protrudes through the slot into the mold cavity and is received by a bevel in the mold to secure the mold within the mold cavity, when the locking bar is in an unlocked position, the locking bar retracts within the slot and does not protrude through the slot to lock the mold in place.

In a preferred embodiment, the locking bar comprises two elongated cam shafts pivotally coupled in parallel orientation. The first cam shaft is coupled to the second cam shaft by one or more toothed hinges. The axis of the tooth hinges are offset from the axis of the first cam shaft. Rotation of the first cam shaft causes the second cam shaft to extend distal from the axis of the first cam shaft. Counterrotation of the first cam shaft causes the second cam shaft to retract towards the axis of the first cam shaft. In the unlocked position, the combined dimensions of both cam shafts is less than that of the locking channel. By rotating the first cam shaft to a locked position, the second cam shaft extends distal from the first cam shaft axis and protrudes through the slot into the mold cavity, thereby securing the mold by its bevel in a similar fashion as described above. By counterrotation of the first cam shaft, the second cam shaft recedes from the slot to unlock the mold from its cavity.

The rotation of the first cam shaft may be executed by hydraulic or pneumatic means whereby the linear movement of the hydraulic or pneumatic action is translated by an elongated geared arm coupled to annular gears within the mold apparatus. The linear movement of the geared arm rotates the annular gears, which radially turn the first cam shaft to an unlocked or locked position.

The means for injecting a molding material into the plurality of mold cavities is best shown in FIG. 4. Once the molding surfaces are pressed together to form the mold cavities 22, 142, the injection material is injected into the mold assembly for the molding of different components. The means for injecting a molding material into the mold assembly for forming a plurality of different components comprises the top clamp plate 12 of the fixed side of the mold assembly having a receiving inlet 30 for injection of the molding material by a conventional injection apparatus (not shown), an interior molding channel 32 for the travel of the molding material from the receiving inlet 30 into a conventional hot manifold system 34, and then into an injection nozzle 36, wherein the molding material once it is injected into the receiving inlet 30 travels through the injection channel 32 into the manifold system 34 through the injection nozzle 36 until the molding material is released by an injection exit nozzle 38 into the sprue 262 of the runner distribution system. Once the molding material is released by the injection exit nozzle 38 into the sprue 262 which is substantially centrally located within the fixed runner block side 264 and the ejector runner block side 266, when the molding surfaces 600, 700 are pressed together, the molding material is distributed though the runner distribution system 250 to the fixed mold cavities 22 and the ejector mold cavities 142, by way of the fixed runner block side 264 in conjunction with the fixed tool runner side 272, and the ejector runner block side 266 in conjunction with the ejector tool runner side 274.

The cooling means for cooling the different molded components once the molded material is injected into the mold assembly comprises a water jacket apparatus.

The means for simultaneously releasing the different molded components once the molding material has set comprises the use of a conventional ejection assembly that causes the simultaneous ejection of the different molded components. As shown in FIGS. 3 and 4, the ejector side 100 of the mold assembly comprises a conventional ejector box assembly 120 comprising a plurality of ejector rails 122, an ejector box plate 124, an ejector retainer plate 126, and a push rod 128 substantially affixed to the ejector box plate 124 through the ejector retainer plate 126. A hydraulic system (not shown) activates the ejector box plate 124 to move vertically upwards causing the ejector retainer plate 126 and hence the push rod 128 to vertically move upwards and abut the first ejector support plate 130 thereby pushing the tool pusher bar 232 into the ejector tool pusher bar retainer plate 224 and first tool back-up plate 226, causing the ejector tool retainer plate 228 to move vertically upwards. As a result, the ejector pins 230, which are substantially affixed to the ejector tool retainer plate 228, move vertically upwards through the ejector tool side 220 of the interchangeable molding tool 200 to abut the different molded components, causing the different molded components to simultaneously eject outwards, releasing the different molded components from the ejector side 100 of the mold assembly.

As previously described, means for separating the different components once the different components have been simultaneously released comprises a baffle sorting apparatus.

Having described the invention in detail, those skilled in the art will appreciate that modifications may be made of the invention without departing from its spirit. Therefore, it is not intended that the scope of the invention be limited to the specific embodiment illustrated and described. Rather it is intended that the scope of the invention be determined by the appended claims and their equivalents.

We claim:

1. A molding press apparatus comprising:

a mold assembly having a fixed side comprising a fixed molding surface, a plurality of a fixed plates, a manifold plate and a top clamp plate, and an ejector side having an ejector molding surface, a plurality of movable plates, an ejector plate, a first ejector support plate, a second ejector support plate, an ejector box assembly and a bottom clamp plate, wherein said molding surfaces when pressed together form a plurality of mold cavities;

a plurality of interchangeable molding tools releasably affixed to said mold assembly for molding a plurality of different components, said interchangeable molding tools having a fixed tool side and an ejector tool side, each fixed tool side of each interchangeable molding tool comprising a plurality of fixed tool holder blocks and a fixed tool back-up plate, said fixed molding surface having a plurality of fixed mold cavities for insertion of each fixed tool side of said interchangeable molding tools, each fixed mold cavity having an outside fixed mold cavity perimeter and each ejector tool side of each interchangeable molding tool comprising a plurality of ejector tool holder blocks, a first ejector tool pusher bar retainer plate, an ejector tool back-up plate, an ejector tool retainer plate, a second ejector tool back-up plate, a tool pusher bar and at least one ejector pin substantially affixed to said first ejector retainer tool back-up plate and extending through the ejector tool retainer plate, said ejector molding surface having a plurality of ejector mold cavities for insertion of each ejector tool side of said interchangeable molding tools, each ejector mold cavity having an outside ejector mold cavity perimeter, said ejector tool side of each interchangeable molding tool having a size smaller than said ejector mold cavities;

a removable runner distribution system comprising a plurality of interchangeable runner blocks, each interchangeable runner block having a sprue, a tool runner system having a fixed tool runner side and an ejector tool runner side, removable runner block sides, each removable runner block side having a fixed runner block side and an ejector runner block side, wherein one end of each fixed tool runner side is substantially adjacent to said fixed runner block side and one end of each ejector tool runner side is substantially adjacent to said ejector runner block side, wherein said fixed runner block side of said interchangeable runner blocks is substantially centrally located between two fixed mold cavities for insertion of said fixed tool sides of said interchangeable molding tools and said ejector runner block side is substantially centrally located between two ejector mold cavities for insertion of said ejector tool sides of said interchangeable molding tools, wherein said interchangeable fixed tool side and said interchangeable runner tool side when inserted into said fixed mold cavity and said ejector mold cavity, respectively, cooperate fluidly with said fixed runner block side and ejector runner block side, respectively, to distribute said molding material into said fixed tool side and said ejector tool side once said molding material is released through said sprue;

a securing means for releasably securing said interchangeable molding tools to said mold assembly, said securing means comprising a plurality of fixed locking keys which releasably lock said fixed tool side of said interchangeable tools to said fixed side of said mold assembly, said fixed molding surface having a plurality of fixed locking key holes located substantially adjacent to each fixed mold cavity perimeter and a plurality of ejector rotating locking keys which releasably lock said ejector tool side of said interchangeable molding tools to said ejector side of said mold assembly, said ejector molding surface having a plurality of ejector locking key holes located substantially adjacent to each outside ejector mold cavity perimeter;

a means for injecting a molding material into said mold cavity for forming said plurality of different components, said means for injecting a molding material into said mold cavity comprising said top clamp plate of said fixed side having a receiving aperture for injection of said molding material by an injection apparatus, a plurality of injection channels, a hot manifold system, and an injection exit nozzle, wherein said molding material once injected into said receiving aperture of said top clamp plate travels through said injection channels into said hot manifold system until said molding material is released by said injection exit nozzle into said sprue of said runner distribution system;

a cooling means for cooling said different components once said molding material has set, said cooling means comprising a water jacket apparatus for injection molding systems;

a releasing means for simultaneously releasing said different components from said mold assembly once said molding material has set, said releasing means comprising the simultaneous ejection of said different components;

a means for separating said plurality of different components once said plurality of different components are simultaneously released, said separating means comprising a baffle sorting system for injection molding machines; and a means for locking said mold assembly when said molding surfaces are pressed together to form said mold cavities.

2. An injection molding press apparatus comprising:

a mold assembly having a fixed side having a fixed molding surface and an ejector side having an ejector molding surface, said ejector side having a plurality of movable plates, an ejector plate, a first ejector support plate, a second ejector support plate, an ejector box assembly and a bottom clamp, said ejector molding surface having a plurality of ejector mold cavities, each ejector mold cavity having an outside ejector mold cavity perimeter, wherein said molding surfaces when pressed together form a plurality of mold cavities;

a plurality of interchangeable molding tools releaseably attached to said mold assembly for molding a plurality of different components, each interchangeable molding tool comprising a fixed tool side, an ejector tool side having a size smaller than each ejector mold cavity for insertion of each ejector tool side of said interchangeable molding tools, tool runner sides having a fixed tool runner side and an ejector tool side;

a removable runner distribution system comprising a plurality of interchangeable runner blocks, each interchangeable runner block having a sprue, a tool runner system, removable runner block sides, a fixed runner block side and an ejector runner block side, wherein one end of said fixed tool runner side is substantially adjacent to said fixed runner block side and one end of said ejector tool side is substantially affixed to said ejector runner block side;

a securing means for releaseably securing said interchangeable molding tools to said mold assembly;

a means for cooling said different components once said molding material has set;

a releasing means for simultaneously releasing said different components from said mold assembly once said molding material has set; and a means for separating said plurality of different components once said plurality of different components are simultaneously released.

3. The molding apparatus set forth in claim 2, wherein said ejector box assembly comprises a plurality of ejector rails, an ejector box plate, an ejector retainer plate and a push rod substantially affixed to said ejector box plate.

4. The molding press apparatus set forth in claim 3, wherein said fixed side comprises a plurality of a fixed plate, a manifold plate, said fixed molding surface having a plurality of fixed mold cavities for insertion of each fixed tool side of said interchangeable molding tools, each fixed mold cavity having an outside fixed mold cavity perimeter, said fixed tool side of each interchangeable molding tool having a size smaller than said fixed mold cavities, and a top clamp plate.

5. The molding press apparatus set forth in claim 4, wherein said fixed runner block side of said interchangeable runner blocks is substantially centrally located between two fixed mold cavities for insertion of said fixed tool sides of said interchangeable molding tools and said ejector runner block side is substantially centrally located between two ejector mold cavities for insertion of said ejector tool sides of said interchangeable molding tools, wherein said interchangeable fixed tool side and said interchangeable runner tool side when inserted into said fixed mold cavity and said ejector mold cavity, respectively, cooperate fluidly with said fixed runner block side and ejector runner block side, respectively, to distribute said molding material into said fixed tool side and said ejector tool side once said molding material is released through said sprue.

6. The molding press apparatus set forth in claim 5, wherein each ejector tool side of each interchangeable molding tool comprises a plurality of ejector tool holder blocks, a first ejector tool pusher bar retainer plate, an ejector tool back-up plate, an ejector tool retainer plate, a second ejector tool back-up plate, a tool pusher bar and at least one ejector pin substantially affixed to said first ejector retainer tool back-up plate and extending through the ejector tool retainer plate.

7. The molding press apparatus of claim 6, wherein each fixed tool side of each interchangeable molding tool comprises a plurality of fixed tool holder blocks and a fixed tool back-up plate.

8. The molding press apparatus set forth in claim 7, wherein said means for injecting a molding material into said mold cavity for forming said plurality of different components comprises said top clamp plate of said fixed side having a receiving aperture for injection of said molding material by an injection apparatus, a plurality of injection channels, a hot manifold system, and an injection exit nozzle, wherein said molding material once injected into said receiving aperture of said top clamp plate travels through said injection channels into said hot manifold system until said molding material is released by said injection exit nozzle into said sprue of said runner distribution system.

9. The molding press apparatus set forth in claim 8, wherein said securing means for securing said interchangeable molding tools to said mold assembly comprises a plurality of fixed locking keys which releasably lock said fixed tool side of said interchangeable tools to said fixed side of said mold assembly, said fixed molding surface having a plurality of fixed locking key holes located substantially adjacent to each fixed mold cavity perimeter; and a plurality of ejector rotating locking keys which releasably lock said ejector tool side of said interchangeable molding tools to said ejector side of said mold assembly, said ejector molding surface having a plurality of ejector locking key holes located substantially adjacent to each outside ejector mold cavity perimeter.

10. The molding press apparatus as set forth in claim 9, wherein said releasing means for simultaneously releasing said different components when said molding material has set comprises the simultaneous ejection of said different components.

11. The molding press of claim 10, wherein said separating means for separating a plurality of different components within said mold assembly once said different components are removed comprises a baffle sorting apparatus.

12. The molding press apparatus set forth in claim 11, wherein said cooling means comprises a water jacket apparatus for injection molding systems.

* * * * *